(12) United States Patent
Randall et al.

(10) Patent No.: US 7,879,280 B2
(45) Date of Patent: Feb. 1, 2011

(54) GROVE IMPRINTING DEVICE FOR INJECTION MOLDED PARTS

(75) Inventors: Curtis Scott Randall, Harrodsburg, KY (US); Daniel Thomas Sudd, Danville, KY (US); Martin Thomas Milburn, Harrodsburg, KY (US)

(73) Assignee: Toyota Boshoku America, Inc., Erlanger, KY (US)

( * ) Notice: Subject to any disclaimer, the term of this patent is extended or adjusted under 35 U.S.C. 154(b) by 6 days.

(21) Appl. No.: 12/466,079

(22) Filed: May 14, 2009

(65) Prior Publication Data

US 2010/0289185 A1 Nov. 18, 2010

(51) Int. Cl.
*B29C 45/36* (2006.01)

(52) U.S. Cl. ............... 264/328.7; 425/195; 425/577

(58) Field of Classification Search .......... 264/296, 264/328.1, 328.7; 425/577, 555, 195
See application file for complete search history.

(56) References Cited

U.S. PATENT DOCUMENTS

| | | | |
|---|---|---|---|
| 5,149,479 A * | 9/1992 | Nakajima ............... 264/163 |
| 5,340,528 A * | 8/1994 | Machida et al. ......... 264/328.7 |
| 5,601,773 A | 2/1997 | Schmidt et al. |
| 5,868,988 A * | 2/1999 | Budnick .................... 264/296 |
| 6,001,295 A * | 12/1999 | Yamamoto ................. 264/296 |
| 6,998,174 B2 | 2/2006 | Porter et al. |
| 7,291,000 B2 | 11/2007 | Ciccone et al. |
| 2008/0116613 A1 * | 5/2008 | Hoogland ............... 264/328.7 |

* cited by examiner

*Primary Examiner*—Jill L Heitbrink
(74) *Attorney, Agent, or Firm*—Dykema Gossett (57) ABSTRACT

The invention provides a mold insert system that includes an insert for insertion into an injection mold apparatus and an actuator. The insert includes a movable imprint plate with a predetermined pattern of protrusions configured to form grooves in an article molded by the mold apparatus. The insert also includes a stationary piece with a pattern of slots configured to correspond to the predetermined pattern of protrusions in the imprint plate. The actuator moves the imprint plate from a first position in which the protrusions on the imprint plate do not extend beyond the slots in the stationary piece to a second position in which the protrusions on the imprint plate extend temporarily beyond the slots in the stationary piece. An injection mold apparatus including the mold insert system, as well as a method of making a molded article including the mold insert system are also provided.

20 Claims, 5 Drawing Sheets

GROVE IMPRINTING DEVICE FOR INJECTION MOLDED PARTS

TECHNICAL FIELD

The invention relates generally to a mold insert system for an injection mold apparatus. More particularly, the invention relates to a mold insert system for an injection mold apparatus that is configured for imprinting grooves into injection molded automotive door panels, for example.

BACKGROUND OF THE INVENTION

It is known that automotive door panels may be made by an injection molding process. Safety standards may require that the automotive door panels be weakened in one or more areas so as to cause a selective collapse of the automotive door panel at the weakened areas, thereby allowing an automobile, including the automotive door panel, to achieve a certain safety rating. To this end, grooves may be incorporated into the automotive door panel to weaken the door in the desired area or areas of the door panel. The use of these grooves in the automotive door panel may be necessary to improve the impact safety rating of the automobile. The locations for the weakened areas set by the safety standards may be continually changing. Accordingly, for an automobile to achieve certain safety ratings, modification to the injection mold apparatus used to form an injection molded plastic door panel may be necessary.

Injection molded plastic door panels formed using a conventional injection mold apparatus, in which at least one of the faces of the injection mold apparatus has permanently protruding projections that are used to form grooves in a portion of the molded article, may be disadvantageous. In particular, conventional injection molded parts with molded-in grooves may show blemishes on the show surface of the molded article (e.g., part) that may be unacceptable to customers. It is believed that such blemishes may be due to the flow of molten material around the permanently protruding projections. As a result of the resulting blemishes, painting or other secondary processes may be required to cover and/or mask the blemishes. Among other drawbacks, the use of painting or other secondary processes adds cost to the manufacturing process. In particular, painting the parts may add a tremendous cost to manufacturing plants. Spray booths and ducting must be purchased, as well as incinerating systems, depending upon the governmental emissions requirements.

Previous attempts to incorporate grooves into the automotive door panel without requiring painting and/or masking have been to mold parts without grooves and then to form (e.g., cut) grooves into the parts using a cutting tool, such as, for example, a robotic cutting tool. The use of a robotic cutting tool may also be disadvantageous because it too adds cost to the manufacturing process and may also produce concerns with the accuracy and repeatability of the machined grooves. The robotic cutting tool may require a cell with a robot, holding fixtures, cutting tools, and guarding. The parts must be hand loaded into a cell and clamped in place prior to forming (e.g., cutting) the grooves, thereby requiring additional manufacturing and also increasing labor costs.

Accordingly, there remains a need for a mold insert system and/or an injection mold apparatus including a mold insert system configured to imprint grooves into the surface of a molded article that minimizes and/or eliminates these deficiencies in the prior art.

SUMMARY OF THE INVENTION

The invention provides a mold insert system for an injection mold apparatus. The mold insert system includes an insert configured for insertion into an injection mold apparatus and an actuator. The insert includes an imprint plate and a stationary piece. The imprint plate includes a predetermined pattern of protrusions configured to form grooves in an article molded by the injection mold apparatus. The imprint plate of the insert is movable. The stationary piece includes a pattern of slots configured to correspond to the predetermined pattern of protrusions in the imprint plate. The stationary piece of the insert is stationary. The actuator is configured to actuate the imprint plate of the insert from a first position in which the protrusions on the imprint plate of the insert do not extend beyond the slots in the stationary piece of the insert to a second position in which the protrusions on the imprint plate of the insert extend temporarily beyond the slots in the stationary piece of the insert.

The invention further provides a method of making a molded article, comprising the steps of: providing an insert for use with an injection mold apparatus; maintaining the insert flush with a wall surface of the injection mold apparatus; injecting molten plastic into the injection mold apparatus; moving the imprint plate of the insert toward the injection mold apparatus; and forming grooves in the article molded by the injection molding apparatus. The insert includes an imprint plate including a predetermined pattern of protrusions, wherein the imprint plate of the insert is movable. The insert also includes a stationary piece including a pattern of slots configured to correspond to the predetermined pattern of protrusions in the imprint plate, wherein the stationary piece of the insert is stationary.

The foregoing and other aspects, features, details, utilities, and advantages of the present invention will be apparent from reading the following description and claims and from reviewing the accompanying drawings.

BRIEF DESCRIPTION OF THE DRAWINGS

The present invention will now be described by way of example, with reference to the accompanying drawings.

DETAILED DESCRIPTION OF THE INVENTION

Figure 1:
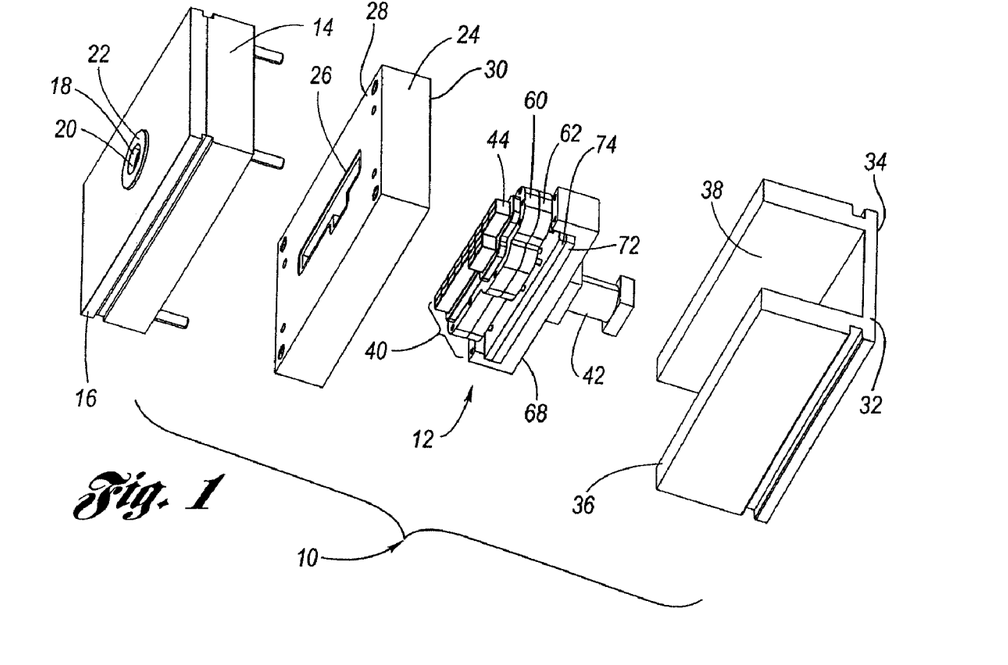
FIG. 1 is a partially exploded view of an injection mold apparatus including a mold insert system in accordance with a first exemplary embodiment of the invention.

Referring now to the drawings wherein like reference numerals are used to identify identical components in the various views, FIG. 1 is a partially exploded view of an injection mold apparatus 10 including a mold insert system 12 in accordance with a first exemplary embodiment of the invention. The injection mold apparatus 10 is configured to form (e.g., mold) a molded article. For example and without limitation, the injection mold apparatus 10 may be used for forming (e.g., molding) automotive door panels. The injection mold apparatus 10 may also be used for forming molded articles or parts other than automotive door panels in other embodiments of the invention. The injection mold apparatus 10 with which the invention mold insert system 12 may be used is conventional in the art except for the addition of mold insert system 12. Injection mold apparatus 10 comprises a cavity portion and a core portion that mate to form a mold cavity and are held together with mold press forces while a molten material is injected into the mold cavity and for a predetermined time thereafter to allow the molded article to form (e.g., solidify). After the predetermined time elapses, the mold is opened and the molded article is removed.

The cavity portion of the injection mold apparatus 10 includes a mold cavity plate 14. Mold cavity plate 14 is conventional in the art and defines a runner (not shown) adapted to supply molten material (e.g., plastic) to the mold cavity defined by the injection mold apparatus 10. The injection mold apparatus 10 also includes a top clamp plate 16. The mold cavity plate 14 and top clamp plate 16 are connected (e.g., mounted or secured) in any manner conventional in the art. For example and without limitation, fasteners such as bolts may be used to connect the mold cavity plate 14 and top clamp plate 16. The mold cavity plate 14 and top clamp plate 16 define a bore 18 extending through the mold cavity plate 14 and top clamp plate 16. Molten material enters the injection mold apparatus 10 through bore 18. A sprue bushing 20 is housed in bore 18. As is known, the sprue bushing 20 is generally cylindrical and is configured to receive an end of a nozzle (not shown). The sprue bushing 20 is in communication with the runner of the mold cavity plate 14 to provide a flow of molten material to the runner. The sprue bushing 20 is secured in the bore 18 to prevent the sprue bushing 20 from rotating in the bore 18 and/or moving in the direction of a longitudinal axis of the bore 18. For example and without limitation, a locking ring (not shown) is used to secure the sprue bushing 20 in bore 18. The mold cavity plate 14 further includes a locating ring 22 that surrounds an end of the sprue bushing 20 and is configured to secure the locking ring to the mold cavity plate 14. Although the mold cavity plate 14 is described as including a sprue bushing 20 and locating ring 22, mold cavity plate 14 may omit one or more of these elements and/or add additional elements in other embodiments of the invention.

The core portion of the injection mold apparatus 10 includes mold core plate 24. Mold core plate 24 includes a pocket 26 for receiving and/or housing at least a portion of the mold insert system 12 in accordance with the present invention. Pocket 26 extends through the mold core plate 24 from a first face 28 to a second face 30 (i.e., opposing the first face 28) of mold core plate 24. Pocket 26 is shaped to generally correspond to the mold insert system 12. The injection mold apparatus 10 also includes a bottom clamp plate 32. The mold core plate 24 is connected (e.g. mounted or secured) to bottom clamp plate 32 in any manner conventional in the art. For example and without limitation, fasteners such as bolts may be used to connect the mold core plate 24 and bottom clamp plate 32. Bottom clamp plate 32 comprises a base 34 with one or more support rails 36. Support rails 36 are disposed on opposing sides of base 34 and, along with base 34, define a channel 38. Channel 38 receives and/or houses at least a portion of mold insert system 12. Channel 38 is configured to receive additional plates (not shown) with apertures configured to receive ejector pins (not shown) so as to be able to eject the molded article from the injection mold apparatus 10. The injection mold apparatus 10 may include any other elements and/or features that are conventional in the art.

The mold cavity plate 14 and the mold core plate 24 are designed for mating such that when the mold cavity plate 14 and the mold core plate 24 are brought together, they define a mold cavity. The mold cavity is in the shape of any desired molded article (e.g., an automotive door panel). Molten material (e.g., molten plastic) is injected between the mold cavity plate 14 and the mold core plate 24 (e.g., into the mold cavity) for producing molded (e.g., plastic) articles. The molten material is injected between the mold cavity plate 14 and the mold core plate 24 in a known and conventional manner. The mold cavity plate 14 and the mold core plate 24 are configured to be movable between open and closed positions for the injection mold apparatus.

Mold insert system 12 is configured for use with the injection mold apparatus 10 to imprint groves into the surface of a molded article or part formed by the injection mold apparatus 10. Mold insert system 12 includes an insert 40 and an actuator 42.

Figure 2:
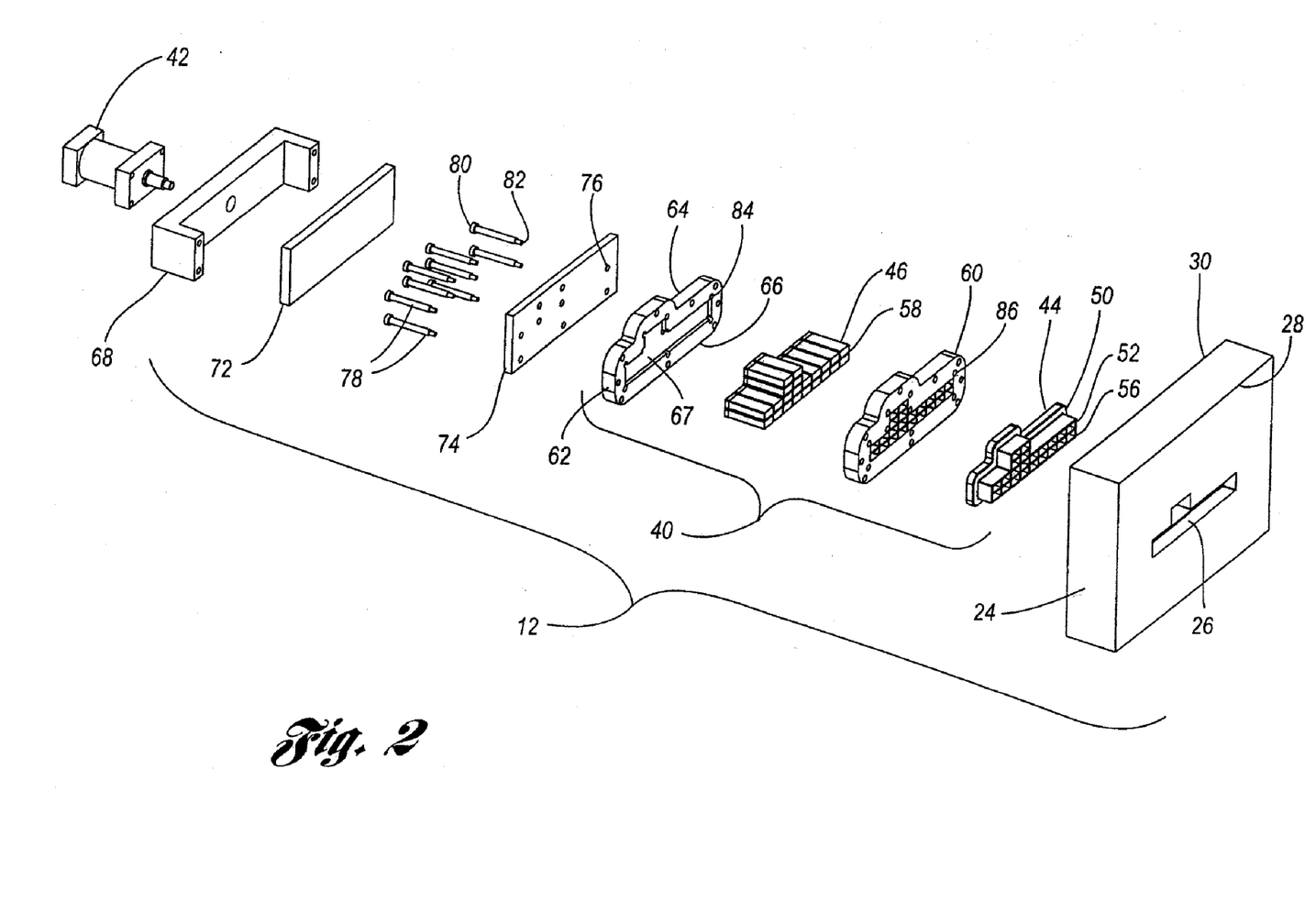
FIG. 2 is an exploded view of the mold insert system of FIG. 1.
Figure 3:
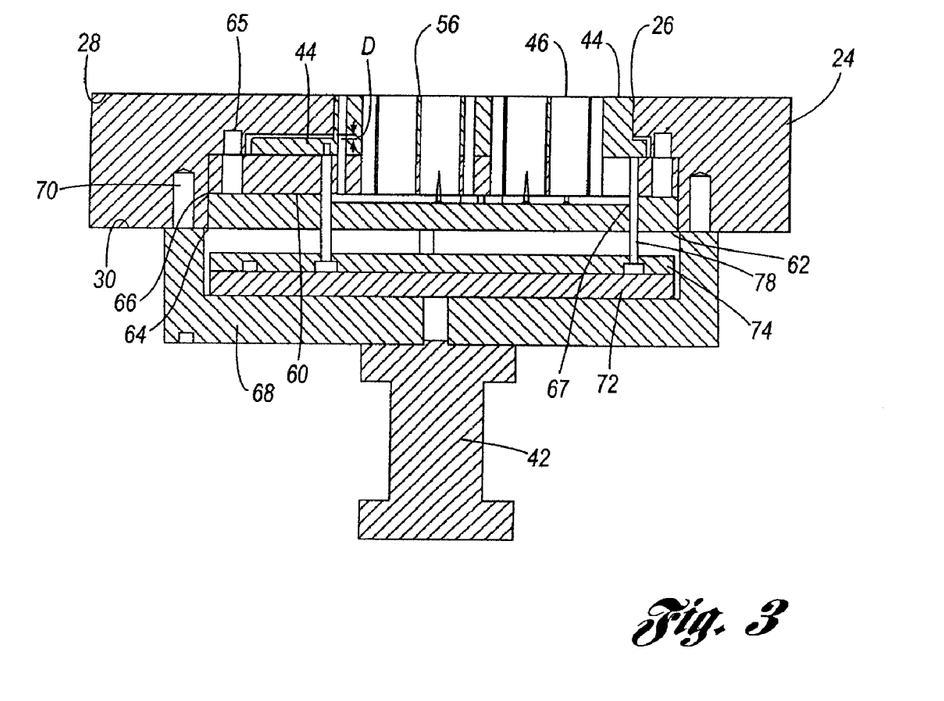
FIG. 3 is a cross-sectional view of the mold insert system of FIG. 2 as assembled.

Referring now to FIGS. 1-3, insert 40 is configured for insertion into injection mold apparatus 10. In particular, insert 40 is configured for insertion into pocket 26 of mold core plate 24. Insert 40 includes imprint plate 44 (e.g., V-imprint stripper plate) and stationary piece 46 (best shown in FIG. 2). Insert 40 is configured for insertion into pocket 26 of mold core plate 24 such that stationary piece 46 is proximate face 28 of the mold core plate 24. In particular, the stationary piece 46 of the insert 40 may be substantially flush with face 28 of the mold core plate 24 in an exemplary embodiment of the invention (best shown in FIG. 3).

Figure 4:
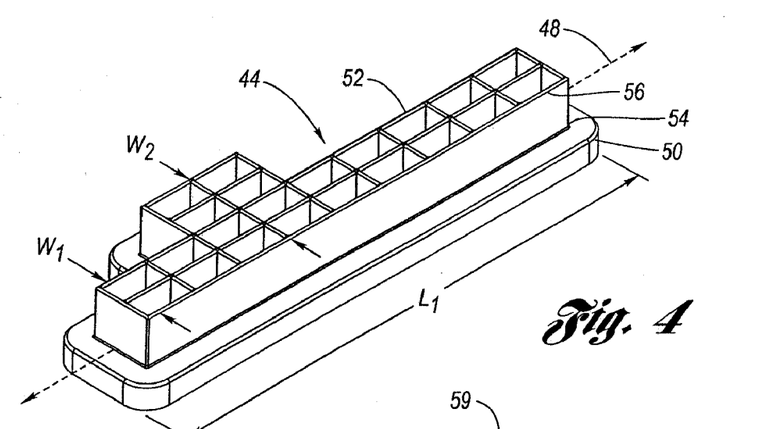
FIG. 4 is a perspective view of the imprint plate of the mold insert system of FIGS. 1-3.
Figure 5:
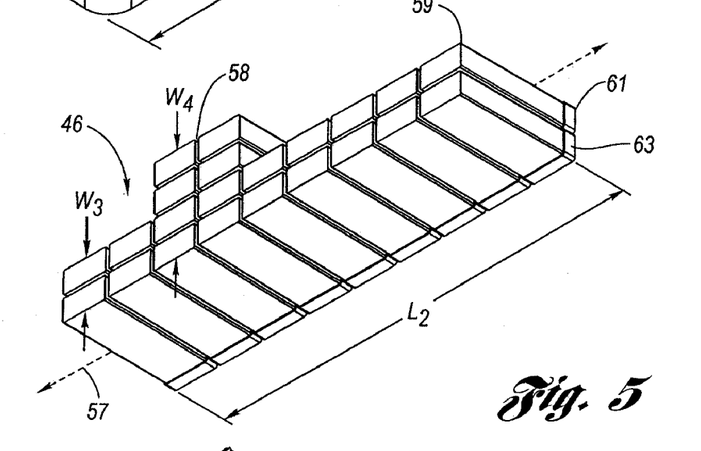
FIG. 5 is a perspective view of the stationary piece of the mold insert system of FIGS. 1-3.

With reference to FIGS. 2 and 4, imprint plate 44 has length $L_1$ and includes a longitudinal axis 48. In an exemplary embodiment, the imprint plate 44 is movable (e.g., movable relative to stationary piece 46) in a first direction and a second direction each substantially perpendicular to the longitudinal axis 48 of imprint plate 16 (e.g., back and forth movement). Although the movement of the imprint plate 44 is described as being in first and second directions that are substantially perpendicular to the longitudinal axis 48 of the imprint plate 44, the movement of the imprint plate 44 is not necessarily always in a substantially perpendicular direction, and may include angled movement (i.e., greater than or less then 90° relative to the longitudinal axis 48 of the imprint plate 44). Imprint plate 44 is not connected to mold core plate 24 since imprint plate 44 is configured to be movable within pocket 26 of mold core plate 24 and must be movable relative to the mold core plate 24. Imprint plate 44 can be asymmetrically shaped as generally illustrated in FIGS. 1-4 (e.g., having a first and second width $W_1$, $W_2$ at different points along the longitudinal axis 48).

Imprint plate 44 further includes a base 50 and protrusions 52 extending radially upwards from base 50 relative to longitudinal axis 48. Protrusions 52 on imprint plate 44 are configured to form grooves in an article molded by the injection mold apparatus 10. The protrusions 52 include a proximal end 54 that is adjacent base 52 and a distal end 56 opposing proximal end 54. The distal ends 56 of protrusions 52 terminate in a "V"-shape in accordance with an exemplary embodiment of the invention. The distal ends 56 of the protrusions 52 may also terminate in any number of various other shapes in accordance with other embodiments of the invention. Protrusions 52 are formed in a predetermined pattern on imprint plate 44 of insert 40. For example, the protrusions 52 may include at least one and/or a plurality of longitudinally extending segments (i.e., extending along longitudinal axis 48). FIGS. 1, 2, and 4 illustrate five longitudinal segments, but the protrusions 52 may include fewer or more longitudinal segments in other embodiments. The longitudinal segments may be of varying lengths. A first longitudinal segment may extend substantially the entire length $L_1$ of the imprint plate 44, and a second longitudinal segment may extend only partially along the length $L_1$ of the imprint plate 44. Although the longitudinal segments are illustrated as extending along the longitudinal axis 48, the longitudinal segments may be angled with respect to the longitudinal axis 48 in other embodiments. The predetermined pattern of protrusions 52 on imprint plate 44 may further include at least one and/or a plurality of perpendicular segments extending perpendicularly to the longitudinal axis 48 of the imprint plate 44. FIGS. 1, 2, and 4 illustrate ten perpendicular segments, but the protrusions 52 may include fewer or more perpendicular segments in other embodiments. The perpendicular segments may be of varying lengths. A first perpendicular segment may extend substantially the entire width $W_2$ of the imprint plate 44, and a second perpendicular segment may extend only partially along the width $W_2$ of the imprint plate 44. Although the perpendicular segments are illustrated as extending perpendicular to the longitudinal axis 48, the perpendicular segments may be at a different angle (e.g., greater than or less than 90°) with respect to the longitudinal axis 48 of the imprint plate 44.

While the protrusions 52 are generally described and illustrated as comprising a predetermined pattern including at least one longitudinal segment and at least one perpendicular segment, the predetermined pattern of protrusions 52 may comprise any number of patterns or arrangements and is not limited to straight segments, such as the straight longitudinal segments and the straight perpendicular segments that are described and illustrated. For example and without limitation, the predetermined pattern of protrusions 52 may comprise curved segments and/or angled segments in other embodiments of the invention.

With reference to FIGS. 1-3 and 5, stationary piece 46 has length $L_2$ and includes a longitudinal axis 57. Stationary piece 46 can be asymmetrically shaped as generally illustrated in FIGS. 1-3 and 5 (e.g., having a first and second width $W_3$, $W_4$ at different points along the longitudinal axis 57). Stationary piece 46 comprises a generally solid element with openings and/or slots 58 extending substantially through the stationary piece 46 from a first end 59 to a second opposing end 61 of the stationary piece 46. Base 63 may be located at the second end 61 of the stationary piece 46.

The pattern of openings and/or slots 58 is configured to correspond to a pattern of protrusions 52 on imprint plate 44. For example, stationary piece 46 includes at least one and/or a plurality of longitudinally extending slots (i.e., extending along longitudinal axis 57). FIGS. 1-3 and 5 illustrate three longitudinal slots, but the pattern of openings and/or slots 58 may include fewer or more longitudinal slots in other embodiments. Each of the longitudinal slots may have a varying length and may extend substantially the entire length $L_2$ of the stationary piece 46 or may only extend partially along the length $L_2$ of the stationary piece. Although the longitudinal slots are illustrated as extending along the longitudinal axis 57, the longitudinal slots may be angled with respect to the longitudinal axis 57 in other embodiments. For another example, stationary piece 46 includes at least one and/or a plurality of perpendicularly extending slots. FIGS. 1-3 and 5 illustrate eight perpendicular slots, but the pattern of openings and/or slots 58 may include fewer or more perpendicular slots in other embodiments. Each of the perpendicular slots may have a varying length and may extend substantially the entire width $W_3$ of the stationary piece 46 or may only extend partially along the width $W_4$ of the stationary piece 46. Although the perpendicular slots are illustrated as extending perpendicular to the longitudinal axis 57, the perpendicular slots may be at a different angle (e.g., greater than or less than 90°) with respect to the longitudinal axis 57 of the stationary piece 46. Stationary piece 46 generally corresponds in length, width, and overall shape to imprint plate 44. The stationary piece 46 is not configured for movement relative to the mold core plate 24 and remains stationary during operation of the mold insert system 12.

In accordance with the first embodiment of the invention illustrated in FIGS. 1-3, insert 40 is an assembly that further includes retainer plate 60 and back plate 62. Although FIGS. 1-3 show insert 40 as including additional elements like retainer plate 60 and back plate 62, these elements may be omitted and/or other elements may be added to insert 40 in other exemplary embodiments of the invention. Referring now to FIG. 3 showing a cross-sectional view of an assembled mold insert system 12, retainer plate 60 is connected to mold core plate 24. Fasteners 65 and/or any other means of connection conventional in the art are used to connect retainer plate 60 to mold core plate 24. Retainer plate 60 is configured to receive stationary piece 46. For example, retainer plate 60 includes at least one and/or a plurality of slots configured to receive the stationary piece 46. Stationary piece 46 is thus at least partially disposed within retainer plate 60. Imprint plate 44 at least partially abuts retainer plate 60. However, imprint plate 44 is not disposed within retainer plate 60. Retainer plate 60, in connection with back plate 62, is configured to connect (e.g., secure) stationary piece 46 to mold core plate 24. The retainer plate 60 is not configured for movement relative to the mold core plate 24 and remains stationary during operation of the mold insert system 12.

Back plate 62 is configured to retain insert 40 (i.e., including imprint plate 44, stationary piece 46, and retainer plate 60) within mold core plate 24. In particular, back plate 62 is configured to back retainer plate 60 and stationary piece 46 so that they are connected to the mold core plate 24. Back plate 62 is disposed at least in part in pocket 26 of mold core plate 24. Back plate 62 has first and second opposing faces 64, 66. The first face 64 of back plate 62 is configured to face actuator 42. The first face 64 of the back plate 62 is flush with face 30 of the mold core plate 24 in an exemplary embodiment of the invention. Although the first face 64 of the back plate 62 is described and illustrated as flush with the face 30 of the mold core plate 24, the location and/or depth of the back plate 62 within the pocket 26 (i.e., relative to the face 30 of the mold core plate 24) may be modified and/or varied. Accordingly, the back plate 62 can be disposed deeper within pocket 26 and/or less deep within pocket 26 in various exemplary embodiments. The depth of back plate 46 within pocket 26 in mold core plate 24 affects the distance of travel of the imprint plate 44, as well as the length of extension of the distal end 56 of protrusions 52 on imprint plate 44 beyond stationary piece 46 and/or beyond face 28 of mold core plate 24 during operation of the mold insert system 12. The second face 66 of back plate 62 is configured to face retainer plate 60. The second face 66 of back plate 62 includes a shallow indentation 67 (best shown in FIGS. 2-3) configured to receive at least a portion of stationary piece 46. For example, at least base 63 of stationary piece 46 is at least partially disposed in the indentation 67 of back plate 62. The back plate 62 is not configured for movement relative to the mold core plate 24 during operation of the mold insert system 12 and remains stationary during operation of the mold insert system 12.

The mold insert system 10 further includes an actuator 42. In an exemplary embodiment, actuator 42 comprises a hydraulic cylinder with a solenoid valve. The hydraulic cylinder can comprise any conventional hydraulic cylinder such as a GRAINGER® hydraulic cylinder commercially available from W. W. Grainger, Inc. Although the actuator 42 is described in detail herein as a hydraulic cylinder with a solenoid valve or a motor, the actuator 42 may comprise any number of other actuators that are conventional in the art. In another exemplary embodiment, actuator 42 comprises a motor connected to a movable cam. The cam is actuated by the operation of the motor. For example and without limitation, actuator 42 may comprise an hydraulic actuator, a pneumatic actuator, or a mechanical actuator.

Actuator 42 is configured to actuate the imprint plate 44 from a first position to a second position. In particular, in the first position, the imprint plate 44 is positioned relative to the stationary piece 46 so that the distal ends 56 of the protrusions 52 on the imprint plate 44 of the insert 40 do not extend beyond the stationary piece 46 of the insert 40. For example, in this first position, the distal ends 56 of the protrusions 52 are retracted (e.g., completely retracted) below a top surface of the stationary piece 46. Referring now to FIGS. 1 and 3, the distal ends 56 of the protrusions 52 are illustrated in the retracted position. In the second position, the imprint plate 44 is positioned relative to the stationary piece 46 so that the distal ends 56 of the protrusions 52 on the imprint plate 44 of the insert 40 extend (e.g., at least partially extend) beyond the top surface of the stationary piece 46 of the insert 40. Only a portion of the distal ends 56 of the protrusions 52 on the imprint plate 44 extend beyond the openings 58 in the top surface of the stationary piece 46, depending upon the desired depth of the groove created by the protrusions 52. Referring again to FIG. 3, the distance of travel of the imprint plate 44 from the first position (e.g., distal ends 56 of protrusions 52 retracted behind stationary piece 46, as shown) to the second position (e.g., distal ends 56 of protrusions 52 extending beyond stationary piece 46) is illustrated as distance D. The imprint plate 44 is in the first position or second position for a temporary period of time before moving to the other position (e.g., from the first position to the second position and/or from the second position to the first position). For example, the imprint plate 44 of the insert 40 can be moved to a second position for a period of time and then can be retracted back to the first position for a period of time. Actuator 42 is configured to move the imprint plate 44 of the insert 40 in a direction perpendicular to, or otherwise angled relative to, the longitudinal axis 48 of the imprint plate 44.

The actuator 42 is configured to move the imprint plate 44 of the insert 40 a predetermined distance D based on the depth of the desired groove to be formed in the molded article. For example, and without limitation, the actuator 42 is configured to move the imprint plate 44 of the insert 40 approximately 1 mm (e.g., 1.07 mm). In an exemplary embodiment, the predetermined distance D is adjustable. For example, and without limitation, the actuator 42 is configured to move the imprint plate 44 of the insert 40 a predetermined distance D in an adjustable range from about 0 mm to about 1.5 mm. Although these predetermined distances are mentioned in detail, the actuator 42 may be configured to move the imprint plate 44 of the insert 40 greater or shorter predetermined distances in other embodiments, depending on the desired depth of the groove to be formed in the molded article. The predetermined distance D of movement of the imprint plate 44 can be adjusted by varying the depth of the imprint plate 44 within the pocket 26 of the mold core plate 24 as described hereinabove.

Actuator 42 is connected to the injection mold apparatus 10. For example and without limitation, a connection bracket 68 is configured to connect and/or attach the actuator 42 to the mold core plate 24. Connection bracket 68 is generally U-shaped including a base and two opposing side walls. The base of connection bracket 68 is configured to receive at least a portion of a first end of actuator 42 (i.e., the movable portion of the actuator 42). Each of the opposing side walls of the connection bracket 68 is configured to connect to face 30 of mold core plate 24. Fasteners 70 or any other means conventional in the art are used to connect the connection bracket 68 to the mold core plate 24. A second end of actuator 42 (e.g., opposing the first end of actuator 42 received by the connection bracket 68) is not configured for connection to the injection mold apparatus 10. In the exemplary embodiment where the actuator 42 comprises an hydraulic actuator, the second end of actuator 42 may include hoses configured to receive fluid for actuation of actuator 42.

Actuator 42 is further connected to insert 40 in order to cause movement of imprint plate 44 of insert 40. In particular, the first end of actuator 42 extending through the base of the connection bracket 68 is further connected to and/or disposed adjacent to an ejector plate 72. Ejector plate 72 is disposed between connection bracket 68 and insert 40, but may not be connected to either connection bracket 68 and/or insert 40. Ejector plate 72 is disposed adjacent a pin plate 74. Pin plate 74 has one or a plurality of apertures 76. The apertures 76 are configured to receive fasteners 78. Fasteners 78 comprise stripper bolts in an exemplary embodiment of the invention. As illustrated in FIG. 2, eight fasteners 78 are used, although more or fewer fasteners 78 may be used in other embodiments of the invention. Fasteners 78 include first and second opposing ends 80, 82. First end 80 comprises the head of the fastener 78. The first end 80 of the fasteners 78 may be adjacent ejector plate 72. Second end 82 comprises the end of the shaft of the fastener 78 and may have a reduced diameter as compared to the head or the shaft of the fastener 78. Fasteners 78 extend through apertures 76 in pin plate 74 and are retained in pin plate 74 through the use of ejector plate 72. In particular, ejector plate 72 abuts first end 80 of the fasteners 78, and retains fasteners 78 extending through pin plate 74. Fasteners 78 further extend through at least one and/or a plurality of apertures 84 in back plate 62, and then through at least one and/or a plurality of apertures 86 in retainer plate 60. Fasteners 78 further extend to imprint plate 44. The second end 82 of the fastener 78 may have a reduced diameter and may extend at least in part through and/or may be disposed adjacent to imprint plate 44. As the movable portion of actuator 42 moves ejector plate 72 during operation of the mold insert system 12, the fasteners 78 and the pin plate 74 through which fasteners 78 are disposed are also moved. The movement of the pin plate 74 and fasteners 78 causes corresponding movement of the imprint plate 44 since the second end 80 of fasteners 78 extends at least in part through and/or is disposed adjacent to the imprint plate 44 as described hereinabove. While fasteners 78 also extend through apertures 84 in back plate 62 and through apertures 86 in retainer plate 60 (best shown in FIG. 2), the movement of fasteners 78 does not cause a corresponding movement of the back plate 62, retainer plate 60, or the stationary piece 46 disposed in retainer plate 60 because the back plate 62 and retainer plate 60 are secured to mold plate 24 (e.g., through fasteners 65) and cannot move relative to mold plate 24. Because stationary piece 46 is disposed within retainer plate 60, fasteners 78 do not actually extend through stationary piece 46 itself. Accordingly, back plate 62, retainer plate 60, and stationary piece 46 all remain stationary despite movement of actuator 42, ejector plate 72, pin plate 74, fasteners 78, and imprint plate 44.

Figures 6, 8, 9:
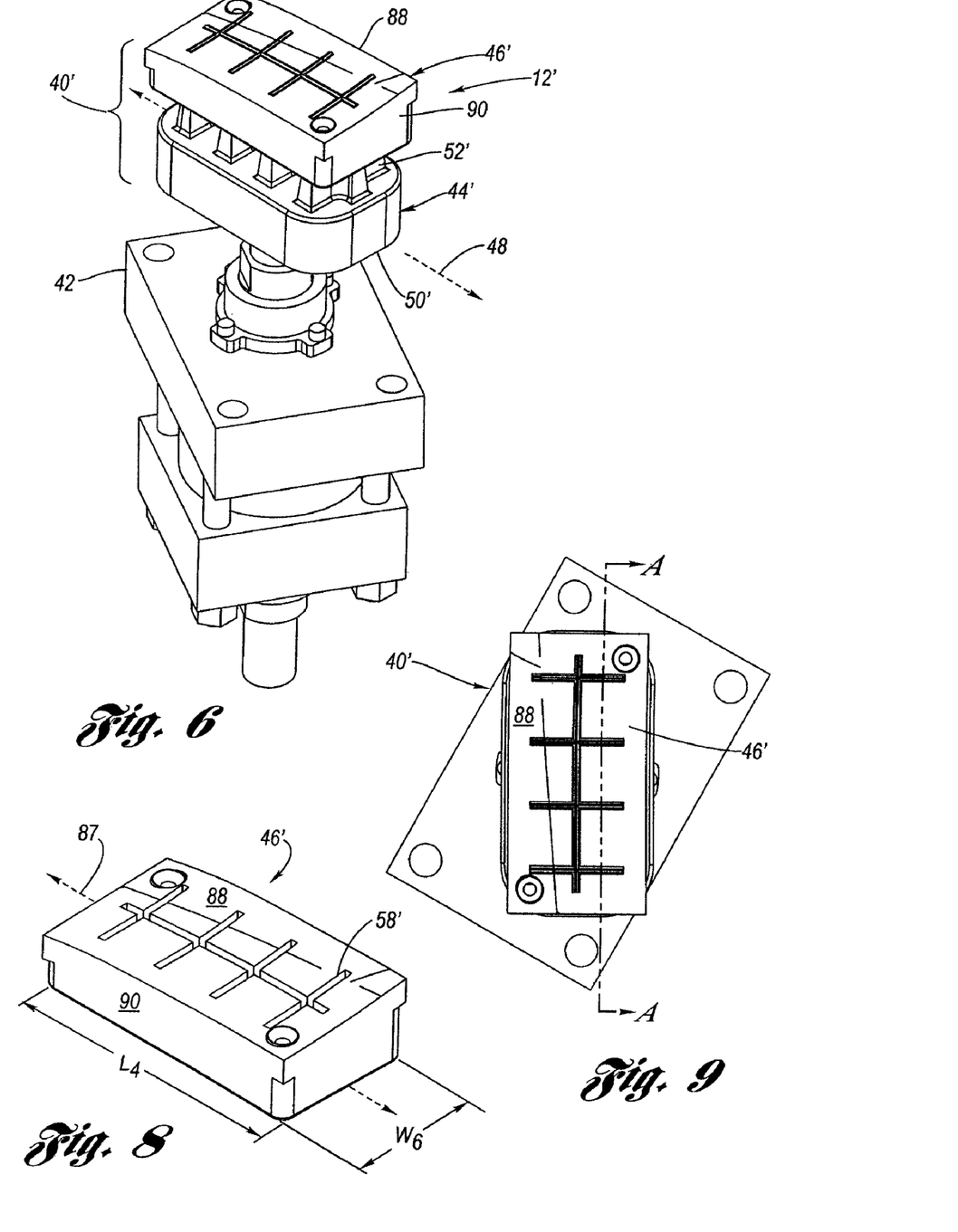
FIG. 6 is a perspective view of a mold insert system in accordance with a second exemplary embodiment of the invention.
FIG. 8 is a perspective view of the stationary piece of the mold insert system of FIG. 6.
FIG. 9 is a top plan view of the mold insert system of FIG. 6.

Referring now to FIG. 6, a mold insert system 12' in accordance with a second exemplary embodiment of the invention is illustrated. Mold insert system 12' is also configured for use with a injection mold apparatus 10 to imprint grooves into the surface of a molded article or part formed by the injection mold apparatus 10. Mold insert system 12' includes insert 40' and actuator 42. Similar to the first exemplary embodiment, insert 40' is configured for insertion into pocket 26 of mold core plate 24 (not shown). Insert 40' includes imprint plate 44' and stationary piece 46'. Insert 40' is configured for insertion into pocket 26 of mold core plate 24 such that stationary piece 46' is proximate side surface 28 of the mold core plate 24. In particular, the stationary piece 46' of the insert 40' is substantially flush with side surface 28 of the mold core plate 24 in accordance with an exemplary embodiment of the invention.

Figure 7:
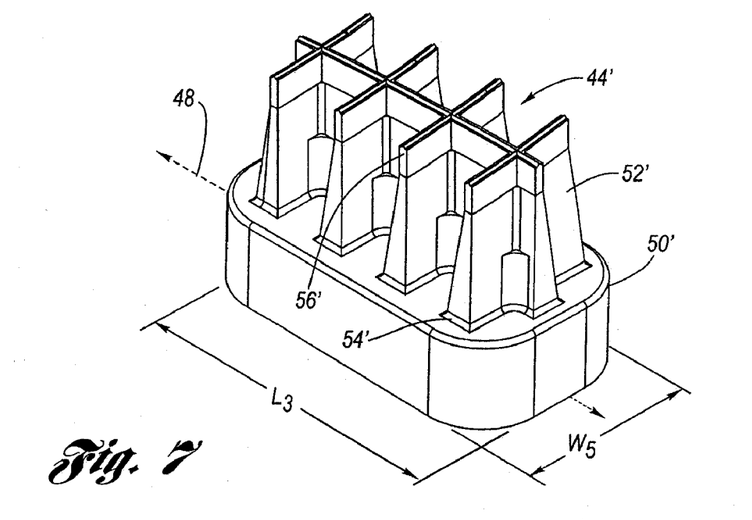
FIG. 7 is a perspective view of the imprint plate of the mold insert system of FIG. 6.
Figure 10:
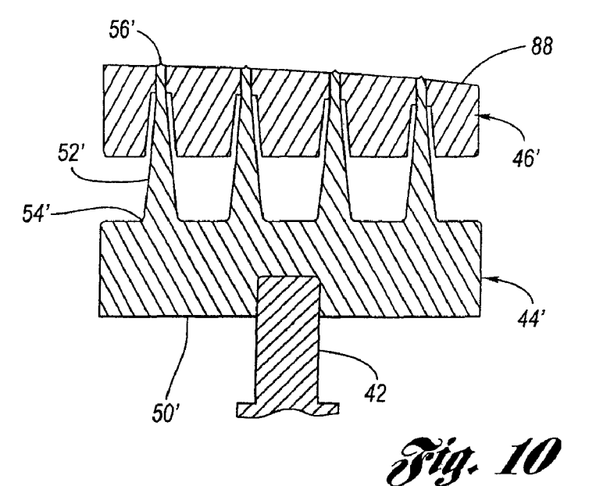
FIG. 10 is cross-sectional view of the insert of the mold insert system of FIGS. 6 and 9 taken along line A-A of FIG. 9.

Referring now to FIGS. 6-7, imprint plate 44' includes longitudinal axis 48. Imprint plate 44' is movable in the same manner as the imprint plate 44 of the first exemplary embodiment. Imprint plate 44' includes a base 50' and protrusions 52' extending radially upwards from base 50' relative to longitudinal axis 48. Protrusions 52' include a proximal end 54' adjacent base 52' and a distal end 56' opposing proximal end 54'. Protrusions 52' generally taper from proximal end 54' to distal end 56' in the second exemplary embodiment. The distal end 56' is configured to form grooves in an article molded by the injection mold apparatus 10 and terminates in a "V"-shape in accordance with an embodiment of the invention. The distal end 56' may also terminate in any number of various other shapes in accordance with other embodiments of the invention. Referring now to FIG. 9 showing a top plan view of the mold insert system 12' of FIG. 6 and also to FIG. 10 showing a cross-sectional view of the insert 40' of mold insert system 12', stationary piece 46' includes a top panel 88 and distal ends 56' of protrusions 52' are illustrated extending beyond top panel 88 of stationary piece 46'.

Protrusions 52' are formed in a predetermined pattern on imprint plate 44' of insert 40'. For example, the protrusions 52' may include at least one and/or a plurality of longitudinally extending segments and at least one and/or a plurality of perpendicular segments. FIGS. 6-7 illustrate one longitudinal segment, but the protrusions 52' may include fewer or more longitudinal segments in other embodiments. The longitudinal segments may be of varying lengths (e.g., may extend substantially the entire length $L_3$ of the imprint plate 44' or may extend only partially along the length $L_3$ of the imprint plate 44'). Although the longitudinal segments are illustrated as extending along the longitudinal axis 48, the longitudinal segments may be angled with respect to the longitudinal axis 48 in other embodiments. FIGS. 6-7 illustrate four perpendicular segments, but the protrusions 52' may include fewer or more perpendicular segments in other embodiments. The perpendicular segments may be of varying lengths (e.g., may extend substantially the entire width $W_5$ of the imprint plate 44' or may extend only partially along the width $W_3$ of the imprint plate 44'). Although the perpendicular segments are illustrated as extending perpendicular to the longitudinal axis 48, the perpendicular segments may be at a different angle (e.g., greater than or less than 90°) with respect to the longitudinal axis 48 of the imprint plate 44'. Although the protrusions 52' are described and illustrated as segments generally extending along the longitudinal axis 48 and/or perpendicular to the longitudinal axis 48, the protrusions 52' may be arranged in any number of predetermined patterns or arrangements. For example and without limitation, the protrusions 52' may include angled segments or curved segments.

Referring to FIGS. 6 and 8, stationary piece 46' has length $L_4$ and includes a longitudinal axis 87. Stationary piece 46' further comprises top panel 88 with a plurality of downwardly extending side panels 90. Stationary piece 46', including top panel 88, comprises openings and/or slots 58' extending substantially through the stationary piece 46', including through top panel 88. The pattern of openings and/or slots 58' is configured to correspond to the pattern of protrusions 52' on imprint plate 44'. For example, stationary piece 46' includes at least one and/or a plurality of longitudinally extending slots. FIGS. 6 and 8 illustrate a single longitudinal slot, but the pattern of openings and/or slots 58' may include more longitudinal slots in other embodiments. Each of the longitudinal slots may have a varying length and may extend substantially along the entire length $L_4$ of the stationary piece 46' or may only extend partially along the length $L_4$ of the stationary piece 46'. Although the longitudinal slots are illustrated as extending along the longitudinal axis 87, the longitudinal slots may be angled with respect to the longitudinal axis 87 in other embodiments. For another example, stationary piece 46' includes at least one and/or a plurality of perpendicularly extending slots. FIGS. 6 and 8 illustrate four perpendicular slots, but the pattern of openings and/or slots 58' may include fewer or more perpendicular slots in other embodiments. Each of the perpendicular slots may have a varying length and may extend substantially the entire width $W_6$ of the stationary piece 46' or may only extend partially along the width $W_6$ of the stationary piece 46'. Although the perpendicular slots are illustrated as extending perpendicular to the longitudinal axis 87, the perpendicular slots may be at a different angle (e.g., greater than or less than 90°) with respect to the longitudinal axis 87 of the stationary piece 46'. The stationary piece 46' is not configured for movement relative to the mold core plate 24 and remains stationary during operation of the mold insert system 12'. Mold insert system 12' in accordance with the second exemplary embodiment is substantially similar in function and operation to the mold insert system 12 in accordance with the first exemplary embodiment described hereinabove.

Figures 11, 12:
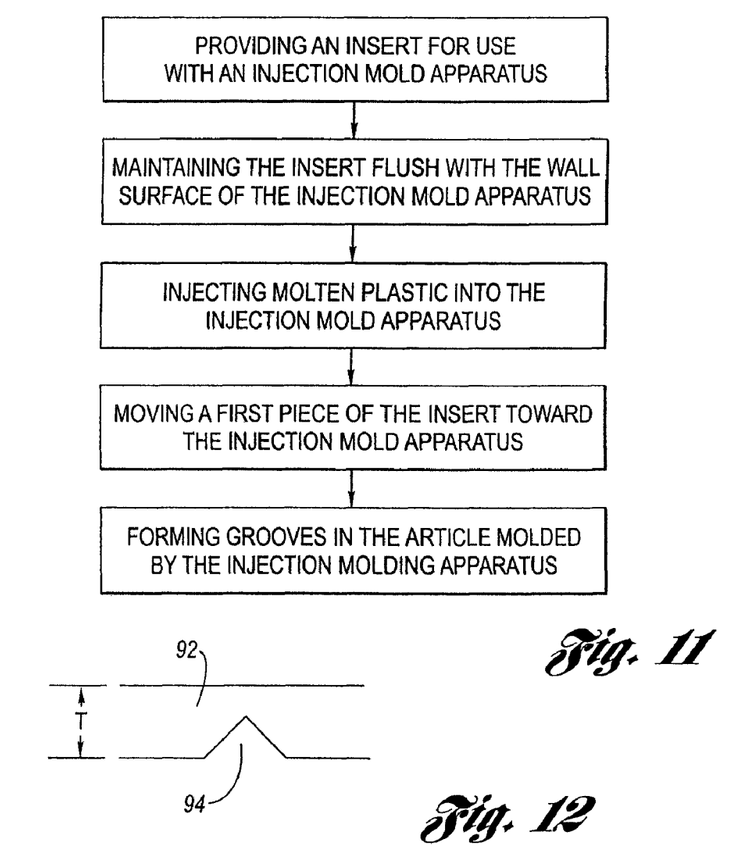
FIG. 11 is a flowchart of a method of making a molded article in accordance with an exemplary embodiment of the invention.
FIG. 12 is an illustration of the groove to be formed in a molded article using either the first exemplary embodiment of the mold insert system shown in FIGS. 1-3 or the second exemplary embodiment of the mold insert system shown in FIGS. 6 and 9-10.

Referring now to FIG. 11, a flowchart of a method of making a molded article in accordance with an embodiment of the invention is illustrated. The method of making a molded article includes one or more of the following steps. These steps include providing an insert 40, 40' for use with an injection mold apparatus 10; maintaining the insert 40, 40' flush with a face and/or wall surface 28 of the injection mold apparatus 10; injecting molten plastic into the injection mold apparatus 10; moving the imprint plate 44, 44' of the insert 40, 40' toward the injection mold apparatus 10 (e.g., toward the mold cavity defined by the mold cavity plate 14 and the mold core plate 24); and forming grooves in the article molded by the injection mold apparatus 10.

The insert 40, 40' may comprise an imprint plate 44, 44' including a predetermined pattern of protrusions 52, 52' and a stationary piece 46, 46' including a pattern of slots and/or openings 58, 58' configured to correspond to the predetermined pattern of protrusions 52, 52' in the imprint plate 44, 44'. The imprint plate 44, 44' of the insert 40, 40' is movable, and the stationary piece 46, 46' of the insert 12 is stationary. In accordance with an exemplary method of making a molded article, the stationary piece 46, 46' of the insert 40, 40' of the mold insert system 12, 12' is substantially flush with the face and/or wall surface 28 of the mold core plate 24, and imprint plate 44, 44' is retracted behind stationary piece 46, 46'. The mold cavity plate 14 and mold core plate 24 are held together to form a mold cavity and molten material is injected into the mold cavity. The imprint plate 44, 44' of the insert 40, 40' of the mold insert system 12, 12' is then actuated by actuator 42. The imprint plate 44, 44' of the insert 40, 40' may be actuated approximately immediately after the transfer from speed control to pressure control by the injection mold apparatus 10. The imprint plate 44, 44' of the insert 40, 40' is moved a predetermined distance. This predetermined distance may be adjustable and may be between about 0 mm to about 1.5 mm in an exemplary embodiment of the invention (e.g., 1 mm). Imprint plate 44, 44' is moved so that at least a portion of the distal ends 56, 56' of protrusions 52, 52' extend beyond the stationary piece 46, 46' into the mold cavity defined by the mold cavity plate 14 and the mold core plate 24 to imprint a groove into the molded article. The distal ends 56, 56' also extend beyond the face and/or side wall 28 of the mold core plate 24 in an exemplary embodiment. Since the molten material injected into the mold cavity is hot, the distal ends 56, 56' of the protrusions 52, 52' form a groove in the molded article.

Referring now to FIG. 12, a partial sectional view of a molded article 92 (e.g., an automotive door panel wall) having wall thickness T is illustrated. FIG. 12 further illustrates a groove 94 imprinted into the molded article 92. Groove 94 may be substantially "V"-shaped in accordance with an exemplary embodiment of the invention. Although groove 94 is illustrated as substantially "V"-shaped in accordance with an exemplary embodiment of the invention, groove 94 may have any number of shapes in accordance with other embodiments of the invention.

The method of making a molded article may further include the steps of retracting the imprint plate 44, 44' of the insert 40, 40' from the injection mold apparatus 10, opening the injection mold apparatus 10, and ejecting the article (e.g., part) molded by the injection mold apparatus 10. In particular, the imprint plate 44, 44' of the insert 40, 40' is retracted after the cooling cycle of the injection mold apparatus 10 is complete (or approximately thereafter). The imprint plate 44, 44' is retracted back toward stationary piece 46, 46' so that the distal ends 56, 56' of the protrusions 52, 52' no longer extend beyond the stationary piece 46, 46'. The injection mold apparatus 10 is then opened, and the molded article or part with the imprinted groove or grooves is ejected from the injection mold apparatus 10. The speed control, pressure control, and cooling cycle stages of the injection mold apparatus are all known and conventional in the art.

The inventive mold insert system may be advantageous because it may not show blemishes on the show surface of molded articles (e.g., automotive door panels) such as those blemishes that might be found on molded articles formed using conventional injection mold apparatuses. Accordingly, the inventive mold insert system may avoid costly secondary operations, such as painting, to mask the grooves on the show surface of the automotive door panels produced by injection molding.

Although only certain embodiments of this invention have been described above with a certain degree of particularity, those skilled in the art could make numerous alterations to the disclosed embodiments without departing from the scope of this invention. For example, the imprint plate of the mold insert system may be configured to form grooves in any number of various shapes, including but not limited to the "V"-shaped grooves described in detail. Further, the mold insert system may be configured for use with an injection mold apparatus for forming any number of various articles or parts, including but not limited to the automotive door panels described in detail. Additionally, all directional references (e.g., up, down, left, right) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected/coupled and in fixed relation to each other. It is intended that all matter contained in the above description or shown in the accompanying drawings shall be interpreted as illustrative only and not limiting. Numerous variations, alternate embodiments, and/or changes in detail or structure will occur to those skilled in the art and may be made without departing from the invention as defined in the appended claims. Accordingly, it is intended that the invention be limited only in terms of the appended claims.

The invention claimed is:

1. A mold insert system for an injection mold apparatus including a mold cavity plate and a mold core plate, the mold insert system comprising:
   an insert configured for insertion into the injection mold apparatus, the insert including:
      an imprint plate including a predetermined pattern of protrusions configured to form grooves in an article molded by the injection mold apparatus, wherein the imprint plate of the insert is configured to be moveable relative to the mold core plate;
      a stationary piece including a pattern of slots configured to correspond to the predetermined pattern of protrusions in the imprint plate, wherein the stationary piece of the insert is configured to be stationary relative to the mold core plate and wherein the stationary piece is separate from both the mold cavity plate and the mold core plate;
   an actuator configured to cause movement of the imprint plate from a first position in which the protrusions on the imprint plate do not extend beyond the slots in the stationary piece to a second position in which the protrusions on the imprint plate extend temporarily beyond the slots in the stationary piece.

2. The mold insert system according to claim 1, wherein the protrusions terminate in a V-shape.

3. The mold insert system according to claim 1, wherein the imprint plate has a longitudinal axis, and the movement of the imprint plate is in a direction that is perpendicular to the longitudinal axis.

4. The mold insert system according to claim 1, wherein the actuator is configured to move the imprint plate a predetermined distance.

5. The mold insert system according to claim 4, wherein the predetermined distance is adjustable.

6. The mold insert system according to claim 4, wherein the predetermined distance is greater than 0 mm and less than 1.5 mm.

7. The mold insert system according to claim 1, wherein the actuator is configured to retract the imprint plate back to the first position.

8. The mold insert system according to claim 1, wherein the actuator comprises a hydraulic cylinder.

9. The mold insert system according to claim 8, wherein the actuator further comprises a solenoid valve.

10. The mold insert system according to claim 1, further comprising a retainer plate configured for receiving the stationary piece.

11. The mold insert system according to claim 10, further comprising a back plate configured for receiving the retainer plate.

12. An injection mold apparatus, comprising:
a mold cavity plate;
a mold core plate having first and second opposing faces and configured for mating with the mold cavity plate to define a mold cavity, wherein the mold core plate includes a facial pocket; and
a mold insert system configured to be at least partially disposed in the facial pocket, the mold insert system comprising:
an insert configured for insertion into an injection mold apparatus, the insert comprising:
an imprint plate including a predetermined pattern of protrusions configured to form grooves in an article molded by the injection mold apparatus, wherein the imprint plate of the insert is configured to be moveable relative to the mold core plate;
a stationary piece including a pattern of slots configured to correspond to the predetermined pattern of protrusions in the imprint plate, wherein the stationary piece of the insert is configured to be stationary relative to the mold core plate, wherein the stationary piece is separate from both the mold cavity plate and the mold core plate, and wherein the stationary piece is configured to be at least partially disposed in the facial pocket of the mold core plate;
an actuator configured to cause movement of the imprint plate from a first position in which the protrusions on the imprint plate do not extend beyond the slots in the stationary piece to a second position in which the protrusions on the imprint plate extend temporarily beyond the slots in the stationary piece.

13. The injection mold apparatus of claim 12, further comprising a clamp plate configured for connection to the mold core plate.

14. The injection mold apparatus of claim 13, wherein the mold insert system is configured to be at least partially disposed in the clamp plate.

15. The injection mold apparatus of claim 12, wherein the stationary piece is substantially flush with one of the first and second opposing faces of the mold core plate.

16. A method of making a molded article, comprising:
providing an insert for use with an injection mold apparatus including a mold cavity plate and a mold core plate, the insert including:
an imprint plate including a predetermined pattern of protrusions, wherein the imprint plate is configured to be moveable relative to the mold core plate;
a stationary piece including a pattern of slots configured to correspond to the predetermined pattern of protrusions in the imprint plate, wherein the stationary piece of the insert is configured to be stationary relative to the mold core plate and wherein the stationary piece is separate from both the mold cavity plate and the mold core plate;
maintaining the insert flush with a wall surface of the injection mold apparatus;
injecting molten plastic into the injection mold apparatus;
moving the imprint plate toward the injection mold apparatus; and
forming grooves in the article molded by the injection molding apparatus.

17. The method of claim 16, wherein the step of moving the imprint plate toward the injection mold apparatus occurs approximately after the injection mold apparatus is transferred from speed control to pressure control.

18. The method of claim 16, further comprising retracting the imprint plate away from the injection mold apparatus.

19. The method of claim 18, wherein the step of retracting the imprint plate from the injection mold apparatus occurs approximately after a cooling cycle of the injection mold apparatus is complete.

20. The method of claim 19, further comprising:
opening the injection mold apparatus; and
ejecting the article molded by the injection mold apparatus.

* * * * *